US010962171B2

(12) United States Patent
Jensen et al.

(10) Patent No.: US 10,962,171 B2
(45) Date of Patent: Mar. 30, 2021

(54) DEVICE AND METHOD FOR PROCESSING A LIQUID UNDER PRESSURE

(71) Applicant: C.C. JENSEN A/S, Svendborg (DK)

(72) Inventors: Carl Aage Jensen, Svendborg (DK); Henning Buch, Svendborg (DK)

(73) Assignee: C.C. Jensen A/S, Svendborg (DK)

( * ) Notice: Subject to any disclaimer, the term of this patent is extended or adjusted under 35 U.S.C. 154(b) by 837 days.

(21) Appl. No.: 14/770,740

(22) PCT Filed: Feb. 27, 2014

(86) PCT No.: PCT/DK2014/050039
§ 371 (c)(1),
(2) Date: Aug. 26, 2015

(87) PCT Pub. No.: WO2014/146666
PCT Pub. Date: Sep. 25, 2014

(65) Prior Publication Data
US 2016/0010797 A1  Jan. 14, 2016

(30) Foreign Application Priority Data

Feb. 27, 2013  (DK) .......................... PA 2013 70110

(51) Int. Cl.
*F16N 39/06* (2006.01)
*F01M 1/10* (2006.01)
(Continued)

(52) U.S. Cl.
CPC ............ *F16N 39/06* (2013.01); *B01D 35/02* (2013.01); *B01D 37/00* (2013.01); *F01M 1/10* (2013.01);
(Continued)

(58) Field of Classification Search
CPC . F16N 13/16; F16N 39/06; F01M 1/10; F05B 2260/98; F03D 80/70; F04C 13/005;
(Continued)

(56) References Cited

U.S. PATENT DOCUMENTS 2,223,070 A * 11/1940 Kleckner .................. F01C 1/10
418/10
3,087,582 A *  4/1963 Potter ...................... F01M 1/02
184/31
(Continued)

FOREIGN PATENT DOCUMENTS

CN         201115804 Y     9/2008
CN         102575806 A     7/2012
(Continued)

OTHER PUBLICATIONS

International Search Report dated Jul. 9, 2014 from PCT/DK2014/050039, 4 pages.
(Continued)

*Primary Examiner* — Charles G Freay
(74) *Attorney, Agent, or Firm* — Ohlandt, Greeley, Ruggiero & Perle, L.L.P.

(57) ABSTRACT

A device for processing of a liquid that includes a device-input for receiving the liquid to be processed at an input-pressure, a device-output for returning the processed liquid at an output-pressure, and a process chamber having a chamber-inlet and a chamber-outlet, and a feed-line for connecting the chamber-inlet to the device-input. The feed-line includes a multi-stage pump for increasing the pressure of the liquid from the input-pressure to a feed-pressure at the chamber-inlet, a discharge-line for connecting the chamber-outlet to the device-output which discharge-line includes back-pressure means adapted to maintain a discharge-pressure at the chamber-outlet upstream of the back-pressure means at an excess-pressure above the output-pressure, and (Continued)

to reduce the pressure of the liquid from the discharge-pressure to the output-pressure downstream of the back-pressure means. The pump in the feed-line is a first stage of a multiple-stage gear pump. The back-pressure means in the discharge-line is a second stage of the multiple-stage gear pump. The second stage is mechanically coupled to the first stage.

14 Claims, 3 Drawing Sheets (51) Int. Cl.
*B01D 35/02* (2006.01)
*B01D 37/00* (2006.01)
*F04C 13/00* (2006.01)
*F16N 13/16* (2006.01)
*F04C 2/10* (2006.01)
*F03D 80/70* (2016.01)

(52) U.S. Cl.
CPC ............ *F04C 2/102* (2013.01); *F04C 13/005* (2013.01); *F16N 13/16* (2013.01); *F03D 80/70* (2016.05); *F05B 2260/98* (2013.01)

(58) Field of Classification Search
CPC . F04C 2/10; F04C 2/201; B01D 35/02; B01D 37/00
USPC ....................................................... 417/6, 10
See application file for complete search history.

(56) References Cited

U.S. PATENT DOCUMENTS

| | | | |
|---|---|---|---|
| 4,502,845 A | 3/1985 | Chana | |
| 4,658,583 A * | 4/1987 | Shropshire | B62D 5/32 137/565.31 |
| 6,547,542 B1 * | 4/2003 | Korner | F04C 2/084 418/1 |
| 7,591,640 B2 * | 9/2009 | Masuda | F04C 2/084 418/10 |
| 7,862,720 B2 | 1/2011 | Brown | |
| 9,303,814 B2 | 4/2016 | Ifield et al. | |
| 2004/0146413 A1 * | 7/2004 | Grant | F04C 13/005 417/410.3 |
| 2011/0180492 A1 | 7/2011 | Wilson | |
| 2016/0010797 A1 * | 1/2016 | Jensen | F01M 1/10 210/808 |
| 2018/0209417 A1 * | 7/2018 | Aleker | F04C 2/102 |

FOREIGN PATENT DOCUMENTS

| | | |
|---|---|---|
| EP | 0 709 553 A1 | 5/1996 |
| EP | 2 103 336 A1 | 9/2009 |
| FR | 2 574 867 A1 | 6/1986 |
| GB | 534634 | 3/1941 |
| GB | 591286 | 8/1947 |
| GB | 1281667 | 7/1972 |
| JP | 3255473 B2 | 8/1994 |
| WO | 2001/029380 A1 | 4/2001 |
| WO | 2009/115092 A1 | 9/2009 |

OTHER PUBLICATIONS

Written Opinion dated Jul. 9, 2014 from PCT/DK2014/050039, 5 pages.

* cited by examiner

DEVICE AND METHOD FOR PROCESSING A LIQUID UNDER PRESSURE

BACKGROUND OF THE DISCLOSURE

1. Field of the Disclosure

The invention relates to a device and for processing of a liquid, the device comprising a device-input for receiving the liquid to be processed at an input-pressure, a device-output for returning the processed liquid at an output-pressure, and a process chamber with a chamber-inlet and a chamber-outlet, the chamber-inlet being connected to the device-input via a feed-line, and the chamber-outlet being connected to the device-output via a discharge-line, wherein the feed-line comprises pump means for increasing the pressure of the liquid from the input-pressure to a feed-pressure at the chamber-inlet, and the discharge-line comprises back-pressure means adapted to maintain an excess-pressure at the chamber-outlet upstream of the back-pressure means at an excess-pressure above the output-pressure, and to reduce the pressure of the liquid from the discharge-pressure to the output-pressure downstream of the back-pressure means.

According to a further aspect, the invention relates to a method for processing a liquid at an excess pressure above an output pressure.

In a particular aspect, the invention relates to a device and method for filtering oil at an excess pressure above an output pressure.

2. Description of the Related Art

Oil is used as a functional liquid in many mechanical systems. Examples for such functions may comprise lubrication, hydraulics, or similar. Numerous degradation and contamination processes affect the lifetime of the oil, as well as the operation, the maintenance and ultimately the lifetime of the machinery using the oil. Continuous cleaning of the used oil is therefore important. Cleaning used contaminated oil is, however, a challenging task where an appropriate process has to be composed for each application according to the type of contaminants to be removed and depending on the particular context of the system in which the cleaning task is to be performed.

For example, when using oil as a lubricant in rotary machinery, such as in a gearbox, and in particular in a wind turbine gearbox, the oil is subject to high shear agitation. As a consequence of the high shear agitation, air is incorporated in the used contaminated oil as finely dispersed bubbles. This results in a particularly turbid, froth-like condition of the used oil, which strongly affects the filtering efficiency. A method and a device for removing solid contaminants from used oil have been disclosed in WO 2009/115092, which is hereby included by reference in its entirety. In this method and device, filtration is performed while maintaining an excess pressure on the downstream side of the filter medium. Thereby, a pronounced increase of the filtering efficiency is achieved. After filtration, the excess pressure is released before returning the cleaned oil to the machinery.

However, performing a processing step, such as filtering, at an excess pressure above an output pressure requires additional pumping power, and thus results in increased energy consumption as compared to a process without excess pressure.

The object of the present invention is to provide a method and a device for processing a liquid at an excess pressure above an output pressure, which can be operated in a flow-through manner, and which overcomes at least some of the above mentioned draw-backs or at least provides an alternative to known methods.

According to a particular aspect, the object of the present invention is to provide a method and device for processing oil, more particularly filtering oil, at an excess pressure above an output pressure, with reduced energy consumption as compared to the above-mentioned prior art.

SUMMARY OF THE DISCLOSURE

According to one aspect, the object is achieved by a device for processing of a liquid, the device comprising a device-input for receiving the liquid to be processed at an input-pressure, a device-output for returning the processed liquid at an output-pressure, and a process chamber with a chamber-inlet and a chamber-outlet, the chamber-inlet being connected to the device-input via a feed-line, and the chamber-outlet being connected to the device-output via a discharge-line, wherein the feed-line comprises pump means for increasing the pressure of the liquid from the input-pressure to a feed-pressure at the chamber-inlet, and the discharge-line comprises back-pressure means adapted to maintain a discharge-pressure at the chamber-outlet upstream of the back-pressure means at an excess-pressure above the output-pressure, and to reduce the pressure of the liquid from the discharge-pressure to the output-pressure downstream of the back-pressure means, wherein the pump means in the feed-line comprises a first stage of a multiple-stage gear pump, and the back pressure means in the discharge-line comprises a second stage of the multiple-stage gear pump, wherein the second stage is mechanically coupled to the first stage.

The device allows for processing a liquid flown in a flow direction from the device-input to the device-output, wherein the processing is performed at an elevated pressure above the pressure of the liquid upstream of the device and above the pressure of the liquid downstream of the device.

The process-chamber of the device comprises, as seen in the direction of flow from the chamber-inlet to the chamber-outlet, an upstream-plenum, a processing-element, and a downstream-plenum. The liqiuid to be processed is flown through the chamber-inlet into the upstream plenum located upstream of the processing element, passed through the processing element for processing the liquid into the downstream-plenum located downstream of the processing-element, and eventually leaves the downstream-plenum through the chamber-outlet.

The device may be used for any processing of the liquid passed through the process chamber, where the process requires stepping up the pressure from the input-pressure at the device-input to the feed-pressure at the chamber-inlet and stepping down the pressure from a discharge-pressure at the chamber-outlet to the output-pressure at the device-output.

The stepping up is achieved by a first gear pump, and the stepping down is achieved by a second gear pump, wherein the first and second gear pumps are provided as first and second stages of a multiple-stage gear pump, wherein the first and second stages are mechanically coupled so as to transfer energy from the second to the first stage. A direct mechanical coupling is considered most efficient. However, another type of mechanical coupling, such as magnetic or electro-magnetic, allowing for transferring mechanical energy recovered from the pressurized discharge-flow by means of the second stage to the first stage, in order to at least partly reuse the energy for driving the first stage, may also be conceived.

Maintaining an excess-pressure in the process chamber also requires feeding the liquid at an increased pressure as compared to a process performed without the excess pressure. While the excess-pressure may be required by the process, or at least be advantageous for e.g. improving the efficiency of the process, the excess pressure requires additional pumping power and therefore increases the energy consumption of the process. The energy stored in the pressurized liquid is released again in the back-pressure means when reducing the pressure from the excess-pressure at the chamber-outlet to the output-pressure at the device-output. The device according to the present invention recovers that energy by exchanging pressure from the discharge-flow to the feed-flow.

The gear pump stages may function as a pump or as a motor. By providing an external drive to the cooperating gear wheels forming a gear pump stage, the gear wheels drive the flow through the gear pump stage, thus operating the fixed displacement machine as a pump. Alternatively, the gear wheels may be driven by the flow through the gear pump stage, thus operating the fixed displacement machine as a motor. The above-mentioned pump means comprises the first stage of the multiple-stage gear pump, and the back pressure means comprises the second stage of the multiple-stage gear pump, wherein the second stage is mechanically coupled to the first stage. The first stage is adapted to operate as a pump to increase the pressure in the feed-flow when filling the process chamber through the first stage. The second stage is adapted to operate as a motor extracting energy from the discharge-flow by decreasing the pressure when emptying the process chamber through the second stage. Under operation, the first stage is driven by an external motor assisted by the second stage that is mechanically coupled to the first stage. The energy released by the pressure reduction in the discharge-flow is recovered by means of the second stage of the multiple-stage gear pump; the recovered energy is transferred from the second stage via the mechanical coupling to the first stage; Energy recovered from decreasing the pressure in the discharge-flow is thus re-used for increasing the pressure in the feed-flow. At the same time, the second stage provides a flow resistance acting as a back-pressure means for maintaining the discharge-pressure at the chamber-outlet at an excess pressure above the output pressure.

The gear pump stages are fixed displacement machines displacing a constant amount of fluid for each revolution of a given gear wheel. The amount of displaced fluid per revolution is determined by the pump design including the actual gear wheel configuration and the layout of the displacement chamber in which the gear wheels of the respective gear pump stage operate. For a given gear pump stage and for a given rotation speed of the cooperating gear wheels defining the displacement, a displacement-rate expressed as the volume displaced through the respective gear pump stage per unit time is fixed. The first stage of the multiple-stage gear pump thus provides a fixed feed-displacement rate depending on a pump speed selected for the first stage. Accordingly, the second stage of the multiple-stage gear pump provides a fixed discharge-displacement rate depending on a pump speed selected for the second stage. By mechanically coupling the second stage to the first stage, the discharge-displacement rate is determined as a function of the feed-displacement rate.

Advantageously according to a preferred embodiment of the device for processing a liquid at an excess pressure, the first stage is operated at a higher displacement-rate than the second stage, and the device further comprises a bypass-line with a first end and a second end, wherein the first end is connected downstream of the first stage and upstream of the second stage, and wherein the second end is connected downstream of the second stage. Under operation, the direction of a flow through the bypass-line is from the first end to the second end. The bypass-line comprises flow adjustment means, such as a pre-configured flow constriction, a biased check valve, an adjustable valve, a regulated valve or the like. The flow through the bypass-line allows for controlling the pressure distribution in the device. Depending on the pressure to be influenced, the first end of the bypass-line may be connected at different locations between the first stage and the second stage: branching-off the bypass-line from the feed-line between the first stage and the chamber-inlet allows for controlling the inlet-pressure; branching-off the bypass-line from the discharge-line between the chamber-outlet and the second stage allows for controlling discharge-pressure and thus the excess pressure for the process; connecting the first end of the bypass-line to the process-chamber allows e.g. for releasing accumulated air and for controlling the pressure in the process chamber. Note also that typically the one or more processing steps performed in the process chamber involve a pressure drop, and that the pressure distribution in the process chamber along the flow may be influenced by accordingly connecting the bypass-line upstream or downstream of the respective processing step.

Advantageously, the first stage displacement rate exceeds the second stage displacement rate by between 2% and 12%, more advantageously between 5% and 10%, wherein a corresponding complementary bypass-flow through flow adjustment means and/or pressure-relief means allows for regulating the pressure distribution in the device.

Preferably, according to one embodiment, the multiple-stage gear pump has a planar arrangement of meshing gear wheels defining the coupled stages. A planar arrangement of meshing gear wheels allows for a design with one-sided access to all components of the multiple-stage gear pump. This facilitates an easy assembly and maintenance of the multiple-stage gear pump as well as direct integration in a process-chamber wall with a pumping chamber for receiving the planar arrangement of meshing gear wheels, which is accessible from the outside of the process chamber wall.

Preferably according to a further embodiment of the device for processing a liquid at excess pressure, the mechanical coupling between the first gear-pump stage and the second gear-pump stage has a fixed gear ratio. Thereby a simple and reliable setup is achieved, and a fixed ratio of a feed-flow rate through the first stage to a discharge-flow rate through the second stage is provided.

Preferably according to a further embodiment, the multiple-stage gear pump is a dual-stage gear pump with three meshing gear wheels. Thereby a particularly simple arrangement is achieved that reduces manufacturing cost and improves reliability. These advantages are particularly prominent when the dual-stage gear pump is implemented with a planar gear wheel arrangement.

Further, according to one embodiment, the first stage is defined by a first gear wheel meshing with a second gear wheel to provide displacement of the liquid from a first intake-port to a first discharge-port, and wherein the second stage is defined by the second gear wheel meshing with a third gear wheel to provide a second stage for displacement of liquid from a second intake-port to a second discharge-port. The first intake-port is connected to the device-input, the first discharge-port is connected to the chamber-inlet, the second intake-port is connected to the chamber-outlet, and the second discharge-port is connected to the device-output.

A number of different embodiments with different gear wheel arrangements are conceivable. In the following the term "outer toothing" refers to teeth provided on an outer surface of a gear wheel to form an external gear, and the term "inner toothing" refers to teeth provided on an inner surface of a gear wheel to form an internal gear.

Further according to one embodiment, an outer toothing on the first gear wheel meshes with an outer toothing on the second gear wheel to define the first stage as an external gear pump, and an inner toothing on the second gear wheel meshes with an outer toothing on the third gear wheel to define the second stage as an internal gear pump. Alternatively, an outer toothing on the first gear wheel meshes with an inner toothing on the second gear wheel to define the first stage as an internal gear pump, and an outer toothing on the second gear wheel meshes with an outer toothing on the third gear wheel to define the second stage as an external gear pump.

Further according to a preferred embodiment, an outer toothing on the first gear wheel meshes with an inner toothing on the second gear wheel to define the first stage as an internal gear pump, and an outer toothing on the second gear wheel meshes with an inner toothing on the third gear wheel to define the second stage as an internal gear pump. Alternatively, an inner toothing on the first gear wheel meshes with an outer toothing on the second gear wheel to define the first stage as an internal gear pump, and an inner toothing on the second gear wheel meshes with an outer toothing on the third gear wheel to define the second stage as an internal gear pump. Thereby, a particularly compact arrangement is achieved.

Advantageously, one or more of the above-mentioned stages that are implemented as internal gear pumps are of the crescent-type.

According to one embodiment, the multiple-stage gear pump comprises one driven gear wheel that is adapted to constitute a rotor of an electrical motor wherein stator coils are arranged in a peripheral housing wall in the vicinity of the rotor. Advantageously, the gear wheel is adapted to constitute the rotor by distributing permanent magnets in a circular arrangement on the gear wheel, typically along the periphery thereof. The permanent magnetic field allows an external alternating electromagnetic field generated by the stator coils to couple to and drive the gear wheel. The electro-magnetic coupling can be provided through a sealed housing wall, thus eliminating the need for a sealed feed-through for a rotating drive axle. Rotating axle seals have the disadvantage that they are prone to wear, are a potential source of leakage, and require additional attention for maintenance and/or repair. The electro-magnetic drive thus increases reliability and ease of operation of the device. Generally speaking, any of the gear wheels of the multiple-stage pump may be selected to be driven from an external drive. Accordingly, any of the gear wheels in the above-mentioned embodiments may be chosen to be equipped with permanent magnets and used as a rotor interacting with stator-coils that are suitably arranged/integrated in an adjacent housing wall of the multiple-stage gear pump to form an electromotor.

According to a preferred embodiment, the outermost gear wheel of a dual-stage internal gear pump constitutes the rotor of an electrical motor wherein stator coils are arranged in the peripheral housing wall around the rotor. Thereby a compact device with a high level of integration of the components is achieved without compromising production cost and reliability.

According to one embodiment, the device is adapted to oil filtration, wherein the process chamber comprises an oil-filter medium for filtering oil. The oil-filter medium is arranged such that oil flown from the chamber-inlet to the chamber-outlet is forced to pass through the oil-filter medium, thereby separating the contaminated oil into a solid phase of solid contaminants, which is retained by the filter, and a liquid phase of cleaned oil, which is released as a filtrate through the chamber-outlet. The filtration is thus performed at an excess pressure, where the back-pressure means ensures that the pressure in the process chamber on the downstream side of the filter medium is maintained at an elevated pressure above ambient pressure and above an output-pressure for returning the processed oil to a setup that is serviced by the device. This embodiment is particularly useful for example for filtering used lubrication oil for retaining solid contaminants, when the device receives the used oil in a turbid condition, i.e. where the oil contains air that is finely dispersed in air bubbles that may be as small as micron-sized. Such a turbid condition is observed, for example, when receiving oil for filtration directly from machinery imposing a high shear agitation on the oil during use. By filtering at a suitable excess pressure, such as above at least 0.3 bar, interference of the air bubbles with the filtering process can be largely reduced, thereby achieving a surprising increase in filter efficiency. As discussed above, the device according to the present invention recovers energy stored in the pressurized liquid downstream of the processing step prior to releasing the liquid through the output, and the recovered energy is re-used in pressurizing the liquid received through the input upstream of the processing step. Thereby the additional energy consumption resulting from performing the processing at the excess pressure is significantly reduced. Therefore even bulk-processing of liquids at an excess pressure with a high-volume throughput, such as the continuous filtration of oil in rotating machinery, becomes viable in terms of the required energy expenditure for maintaining the excess pressure.

Preferably according to a further embodiment, the process chamber and the multiple-stage gear pump are integrated in a common housing, thereby achieving a compact design.

Further according to one embodiment, the multiple-stage gear pump defined by the arrangement of meshing gear-wheels is integrated on a first side of a base plate and the process chamber is defined on a second, opposite side of the base plate by a cover/lid/hat/housing, wherein feed and discharge lines are provided as through-bores defining channels through the base plate, said channels connecting the pumping chambers on the first side of the base plate with the process chamber arranged on the second side of the base plate. Thereby a particularly compact, service-friendly assembly is achieved that facilitates easy production. In particular, these advantages are further enhanced when combined with an embodiment having a planar arrangement of meshing gear wheels defining the different stages of the multiple-stage gear pump.

According to a further aspect, the object of the invention is achieved by a method of processing a liquid at an excess pressure, wherein the method comprises the steps of
receiving an input flow of the liquid at an input pressure
feeding the input flow to a process chamber through a chamber-inlet, increasing the pressure from the input pressure to an inlet pressure at the chamber-inlet using pumping means,
processing the liquid in the process chamber,
maintaining a discharge-pressure (p3) at a chamber-outlet (210) of the process chamber (209) at an excess-pressure (pe) above an output-pressure (p4),
discharging the processed liquid through the chamber-outlet (210), and
reducing the pressure from the discharge-pressure (p3) to the output pressure (p4) using back-pressure means, wherein
the step of increasing the pressure is performed using a first stage of a multiple-stage gear pump, and
the step of reducing the pressure is performed using a second stage of the multiple-stage gear pump operated as a motor, said second stage (213) being driven by the liquid flow downstream of the processing step, thereby recovering energy from the pressurized liquid prior to returning the liquid at the output pressure, and wherein
the second stage is mechanically coupled to the first stage so as to transfer the mechanical energy recovered by the second stage to the first stage.

Advantageously, the method according to the invention is performed using any of the above-mentioned embodiments of a device according to the invention.

By the above-mentioned embodiments of a method according to the invention, the analogous advantages are achieved as discussed above with respect to the embodiments of a device according to the invention.

In a broader aspect of the invention, the device and method may be adapted to processing the liquid in the process chamber at an elevated pressure (excess-pressure) or at a reduced pressure (vacuum) as compared to the input and output pressures. Common for both cases is that a pressure change occurs in the liquid feed, which is at least partially reversed in the liquid discharge.

As discussed above, when processing at an excess pressure, a discharge-pressure at the chamber-outlet is maintained above the output pressure. The excess pressure is the difference between the discharge-pressure and the output-pressure. When operating the processing in the process chamber at an excess-pressure, the pressure at the chamber-inlet and the pressure at the chamber-outlet are both greater than the input-pressure and the output-pressure. The first stage of the multiple-stage gear pump is operated as a pump in the feed-line and the second stage is operated as a motor in the discharge-line contributing to driving the first stage by a mechanical coupling as described above.

When operating the processing in the process chamber at a vacuum-pressure the pressure at the chamber-inlet and the pressure at the chamber-outlet are both less than the input-pressure and the output-pressure. In this case, a means for generating vacuum, such as a vacuum-pump (e.g. of the liquid-ring type), is connected via a vacuum-port to the process-chamber to reduce the pressure inside the process-chamber as compared to the outside of the process-chamber.

Liquid to be processed under vacuum is flown through the chamber-inlet into an up-stream-plenum of the process-chamber, passed through a processing element for processing the liquid to a downstream-plenum of the process-chamber, and leaves the downstream-plenum through the chamber-outlet. The first stage of the multiple-stage gear pump receives the liquid from the device-input and is operated as a dosing means for controlling the feed-flow of liquid through the chamber-inlet into the upstream-plenum of the process chamber. The second stage of the multiple-stage gear pump is operated as a discharge-pump for discharging the processed liquid from the down-stream plenum of the process chamber through the chamber-outlet and returns the processed liquid to the device-output.

Since both stages are fixed displacement pumps, the displacement-rates are determined by the layout and the rotation speed of the gear wheels of the respective stage.

The first stage, through which the pressure is decreased along the flow-direction, is chosen as a limiting dosing element for controlling the feed-flow from the input through the chamber-inlet into the process chamber, which is maintained under vacuum. Thereby an excessive feed-flow spoiling the vacuum is prevented, while ensuring an adequate/sufficient feed-flow to maintain a desired throughput for the processing. The second stage is operated as discharge-pump acting on the chamber-outlet for retrieving the processed liquid from the processing chamber. The pressure through the second stage thus increases along the flow direction. Again, in a typical configuration, the gear pump stage through which the pressure is increased along the direction of flow is dimensioned larger than the gear pump stage through which the pressure is decreased along the direction of flow.

In the context of a vacuum-processing device, this has the advantage that the smaller gear pump stage on the input side provides feed-flow control, while the oversized gear pump on the output side ensures sufficient pumping capacity for emptying the down-stream-plenum, or at least keeping the liquid level in the process chamber below a maximum level under operation, in order to prevent liquid from reaching the vacuum port. In a preferred simple configuration, due to this dimensioning of the gear pump stages, no additional control elements for controlling the flow through the process-chamber required. However, in a typical set-up the second stage is protected by providing a flow resistance on the pressure side of the pump ensuring that a minimum of liquid remains in the pump to provide lubrication.

It is conceived that an advantageous embodiment of a system for processing a liquid under vacuum is already achieved by providing first and second gear pumps in the feed-line and the discharge-line of the device, respectively, wherein the gear pumps are advantageously configured and dimensioned as discussed above, but without a mechanical coupling between the first and second gear pumps. In particular, by over-sizing the discharge gear pump with respect to the feed gear pump this embodiment already achieves the advantage of providing a good control of the feed-flow and liquid level control for safely maintaining a vacuum also in continuous operation, without the need for any additional level control means, such as sensor means inside the chamber. Advantageously, the discharge pump is dimensioned to a maximum capacity exceeding the maximum capacity of the feed-pump by at least 10%, by between 10% and 30%, and typically by about 20%.

Further, by mechanically coupling the first stage controlling the feed-flow rate to the second stage controlling the discharge-flow rate, an improved operational safety is achieved. In particular in the case of a failure resulting in a stop of the second stage, the first stage is also stopped automatically, thereby avoiding the build-up of an overpressure in the processing chamber resulting in spill or damage to the first stage or spill-over of liquid into the vacuum-system.

The analogue embodiments as described for the device operating at an excess-pressure will achieve the analogue advantages for the manufacturability, reliability, and service friendliness of the device.

BRIEF DESCRIPTION OF DRAWINGS

In the following, the invention is further explained referring to an exemplifying embodiment. The drawings show on FIG. 1 A schematic of a prior art device operating in a set-up, FIG. 2 A schematic of one embodiment of a device according to the invention operating in a set-up, FIG. 3 An elevated view of a planar dual stage internal gear pump, FIG. 3A A close-up view of a portion of FIG. 3, and FIG. 4 A schematic view of a filter device according to one embodiment of the invention.

DETAILED DESCRIPTION OF THE DISCLOSURE

Figure 1:
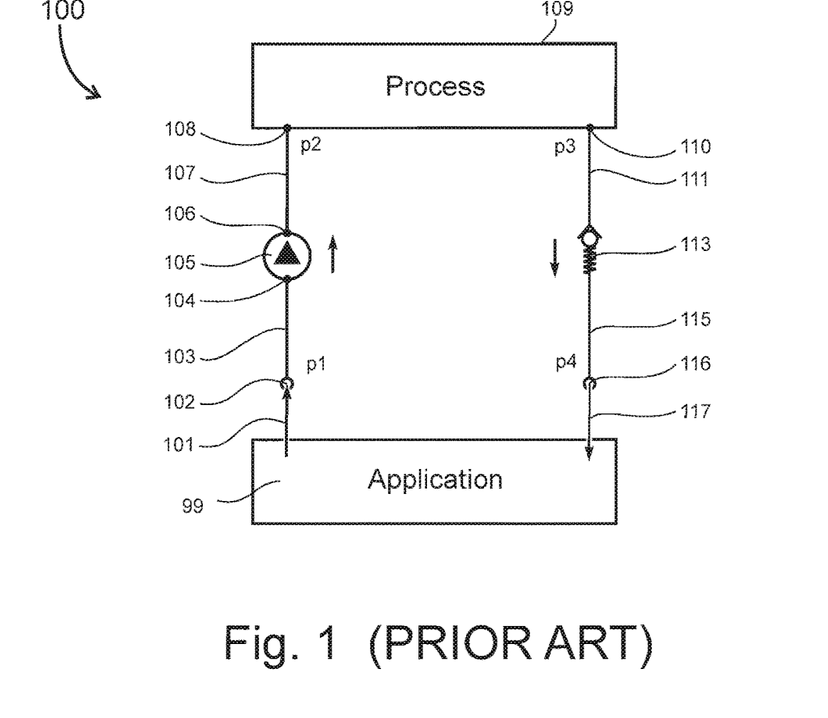

FIG. 1 shows schematically a prior art set-up with a device 100 for receiving a working liquid from a given application 99, processing the working liquid at an elevated pressure and returning the processed liquid to its use in the given application 99. Arrows indicate the direction of flow through the set-up. An example for an application 99 may be the above-mentioned wind turbine gearbox using oil for the lubrication, wherein the used oil is transferred directly from the gearbox lubrication system to the device for filtering of the oil to retain particulate contaminants resulting from wear in the gearbox. After filtration, the filtered oil is immediately returned to its use in the lubrication system.

An input-flow 101 of the working liquid is received at an input-pressure p1 at a device-input 102 of the device 100. From the device-input 102, the working liquid is transferred to an intake-port 104 of a pump 105 via the first portion 103 of a feed line. The pump 105 increases the pressure of the working liquid from the input-pressure p1 to the feed-pressure p2. The working liquid leaves the pump 105 through a discharge-port 106 of the pump 105, and is fed through a chamber-inlet 108 via a second portion 107 of the feed-line to a process-chamber 109, where the working liquid is processed. During the processing the pressure of the working liquid may change by an amount dp. Typically a pressure drop occurs during the process, thereby reducing the pressure of the working liquid from the feed-pressure p2 to a discharge-pressure p3. The working liquid leaves the process-chamber 109 through a chamber-outlet 110. From the chamber-outlet 110, the working fluid passes through a first portion 111 of a discharge-line, a biased check-valve 113, and a second portion 115 of the discharge-line to a device-output 116. From the device-output 116, an output-flow 117 of the processed working fluid is returned to the application 99 at an output-pressure p4. The biased check-valve acts as a back-pressure means maintaining the discharge-pressure p3 at an excess pressure pe above the output-pressure p4. The device 100 is thus adapted to processing the working liquid in the processing chamber 109 at an excess pressure pe by providing a feed-pump 105 in the feed-line 103, 107 and back-pressure means in the discharge-line 111, 115. Such back-pressure means may be the shown biased check-valve 113, or fixed or adjustable constrictions. Upon passing of the working liquid through the back-pressure means, the excess pressure pe is released so that the pressure of the working liquid is reduced from the discharge-pressure p3 to the output pressure p4.

Figure 2:
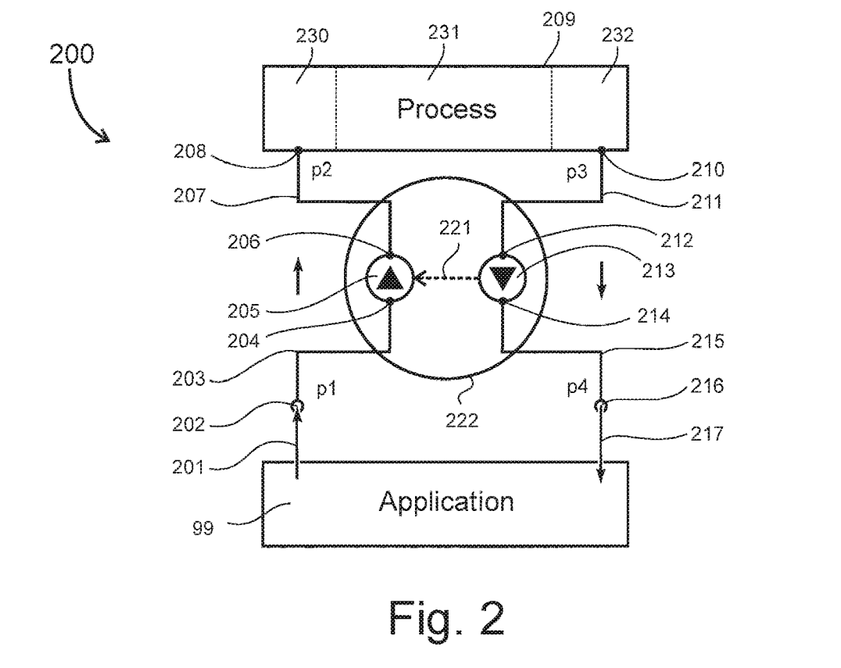

FIG. 2 shows schematically an improved device 200 for processing a working liquid at an excess pressure pe according to one embodiment of the invention. The device 200 of FIG. 2 differs from the device 100 of FIG. 1 in that the pump 105 and the biased check-valve 113 are replaced by a first stage 205 and a second stage 213 of a dual-stage gear pump 222, wherein the second stage 213 is mechanically coupled to the first stage 205. The first stage 205 is operated as a pump, which receives energy from an external drive to increase the pressure of the liquid passed through the first stage 205. The second stage 213 is operated as a motor, which receives energy from the reduction of the pressure of the liquid flowing through the second stage 213. Via the mechanical coupling 221, recovered mechanical energy is transferred from the second stage 213 to the first stage 205 as indicated by the broken arrow in FIG. 2, thereby assisting in driving the first stage 205 and, as a consequence, reducing the device's consumption of externally provided energy.

Figure 3:
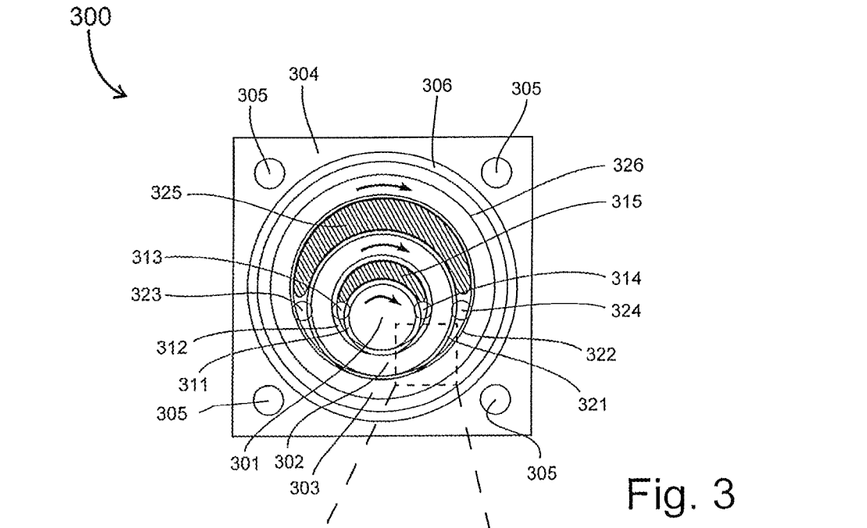
Figure 3A:
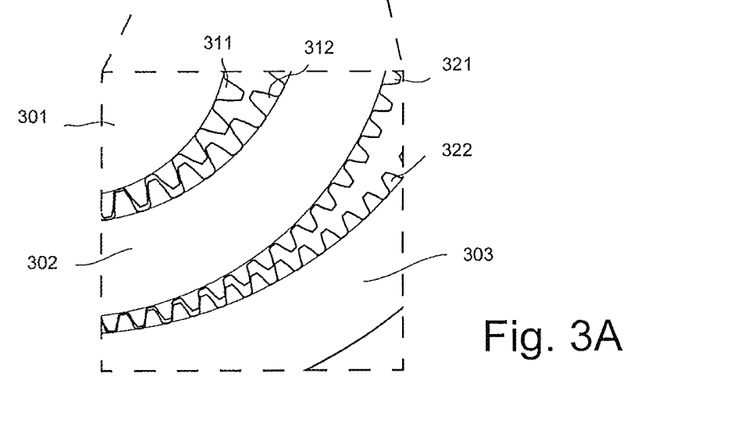

FIG. 3 shows schematically an elevated view of the inside of a dual-stage gear pump 300 with three meshing gear wheels 301, 302, 303, which are placed in a planar arrangement inside a pumping-chamber defined by a housing 304. The housing 304 features flange means, such as the bolt holes 305 and sealing means, such as the circumferential recess 306 for receiving an O-ring seal around the periphery of the pumping-chamber. The housing 304 may be sealed with a lid (not shown), which has a sealing surface cooperating with the sealing means 306 to provide a seal when the lid is attached to the flange means 305 of the housing 304. The embodiment shown has a particularly compact configuration, wherein the three gear wheels 301, 302, 303 are arranged within each other to form a dual-stage internal gear pump.

Considering that the first gear wheel 301 is driven by an external drive (not shown) in a clockwise direction, with the second and third gear wheels following in the same direction as indicated by the arrows, a first stage of the dual-stage gear pump 300 is defined by an outer toothing 311 on the first gear wheel 301, which meshes with an inner toothing 312 on the second gear wheel 302, thereby forming an internal gear pump providing displacement from a first intake-port 313 to a first discharge-port 314. A second stage of the dual-stage gear pump 300 is defined by an outer toothing 321 on the second gear wheel 302, which meshes with an inner toothing 322 on the third gear wheel 303, thereby forming an internal gear pump providing displacement from a second intake-port 323 to a second discharge-port 324. The second gear wheel 302 thus meshes with both the first gear wheel 301 and with the third gear wheel 303, thereby mechanically coupling the first and second stages of the dual-stage gear pump 300 to each other with a fixed gear ratio.

The first and second internal gear pump stages of the shown embodiment are of the crescent-type, wherein the first stage comprises a first crescent 315 between the first gear wheel 301 and the second gear wheel 302, and the second stage comprises a second crescent 325 between the second gear wheel and the third gear wheel.

When operating the above-described dual-stage gear pump 300 in one embodiment of a device for processing a liquid at an excess pressure, such as the device shown in FIG. 2, the first intake-port 313 is connected to the device-input 202 for receiving liquid from an application 99. The first stage defined between the first and second gear wheels 301, 302 increases the pressure from the input-pressure p1 to the feed-pressure p2. The first discharge-port 314 is connected to the chamber-inlet 208 for feeding the liquid to the process-chamber 209 at the feed-pressure p2 on the up-stream-side of the process. The second intake-port 323 is connected to the chamber-outlet 210 for receiving liquid released from the process chamber 209. The second discharge-port 324 is connected to the device-output 216 for returning the processed liquid to the application 99. Due to the mechanical coupling of the second stage to the first stage, the second stage provides a flow resistance to the discharge-flow received from the chamber-outlet 210. The second stage thus acts as a back-pressure means maintaining an elevated pressure p3 in the process-chamber 209 on the downstream side of the process. When passing the liquid through the second stage the pressure drops by the excess pressure pe from the discharge-pressure p3 to the output-pressure p4. The second stage is operated as a motor driven by the energy drop. The second stage thus recovers energy associated with the excess pressure p3 from the liquid. The recovered energy is put to use by transferring mechanical energy from the second stage to the first stage via the fixed mechanical coupling of the second gear wheel 302 to assist in driving the first stage as a pump.

It should be noted that the roles of the meshing gear wheels of a multiple-stage gear pump in a device according to the invention may be interchanged, depending on how the intake- and discharge ports are connected, and depending on which of the meshing gear wheels is driven externally. For example, the outermost gear wheel 303 may be driven externally and form the first stage together with the intermediate gear wheel 302, wherein the outer intake- and discharge-ports 323, 324 are connected into the feed-line 203, 207 of the device 200. The second stage is then formed by the intermediate gear wheel 302 and the innermost gear wheel 301, wherein the inner intake- and discharge-ports 313, 314 are connected into the discharge-line 211, 215 of the device. The external drive of the outermost gear wheel 303 may be integrated into the housing by adapting the outermost gear wheel 303 to constitute a rotor of an electrical motor, e.g. providing permanent magnets (not shown) around the periphery of the outer gear wheel 303, and arranging cooperating stator coils (not shown) in the housing 304, the stator coils extending radially outward around the periphery of the outer gear wheel 303.

The housing 304 may further be adapted to comprise a process chamber defined between a base plate of the housing and a chamber cover, wherein the base plate is configured to receive the planar gear wheel arrangement forming the multiple-stage pump on one side, and further to attach the chamber cover on another side of the base plate in a sealed way, preferably on a side facing away from the multiple-stage gear pump. Most preferably, the base plate further comprises channels corresponding to the feed- and discharge-lines 203, 207, 211, 215 of the device of FIG. 2, with openings defining the device-input 202, the chamber-inlet 208, the chamber-outlet 210, and the device output 216.

Figure 4:
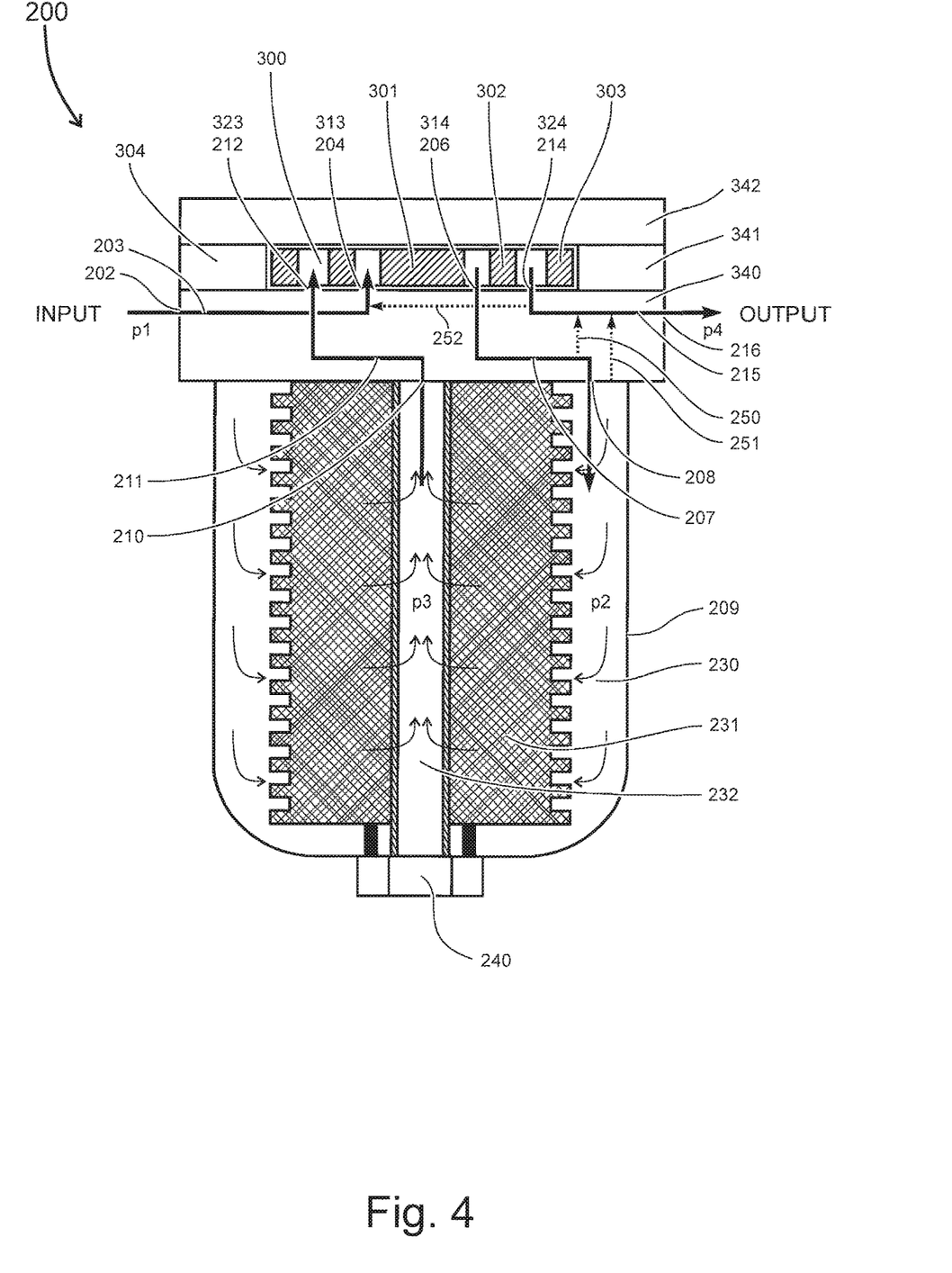

FIG. 4 shows schematically an embodiment of a filtering device 200 having an integrated planar dual stage internal gear pump 300. The filtering device 200 has a modular base 304 comprising three modules 340, 341, 342. A first module 340 comprises a device-input 201, a device-output 216, pump intake- and discharge-ports 204/313, 212/323, 206/314, 214/324, a chamber-inlet 208 and a chamber-outlet 210, as well as connecting conduits 203, 207, 211, 215. A second module 341 comprises a cavity defining a pumping chamber in which three meshing gear wheels 301, 302, 303 are placed in a planar arrangement so as to form a dual stage internal gear pump. The arrangement of the gear wheels 301, 302, 303 corresponds to that of the dual stage gear pump 300 shown in FIG. 3 as seen in a cut-plane perpendicular to the gear wheel plane and comprising the intake- and discharge-ports. The second module 341 communicates with the first module 340 through the intake- and discharge-ports 204/313, 212/323, 206/314, 214/324. A third module 342 provides an external drive for the second module 341. The external drive may be an electro-motor or a hydraulic motor coupled to one of the gear wheels, such as the innermost gear wheel 301, via a drive shaft and/or transmission (not shown). Alternatively, the motor module may couple magnetically to the respective driven gear wheel, or the motor module may comprise stator coils cooperating with a gear wheel of the second module configured as a rotor to form an electromotor as discussed above.

Directly adjacent to the base portion 304, filtering device 200 further has a processing chamber 209, which may be defined by a filter cover directly attached to the first module 340 in a sealing engagement and secured by a hollow stay-bolt 240. The processing chamber 209 communicates with the first module 340 via chamber inlet 208 and chamber-outlet 210. Inside the chamber 209, the filtering device 200 comprises a filter-element 231 which separates a peripheral upstream-plenum 230, that is defined between the radially outward facing surface of the filter-element 231 and the peripheral wall of the process chamber 209, from a central downstream-plenum 232, that is defined by the axially extending centre-bore of the hollow stay-bolt 240. Liquid entering the upstream-plenum 230 through the chamber-inlet 208 is thus forced to pass through the filter-element 231, before the liquid reaches the downstream-plenum 232 and leaves the process-chamber 209 through the chamber-outlet 210.

The filtering-device 200 may further comprise a bypass-line 250, 251 with a first end and a second end, wherein the first end is connected downstream of the first stage and upstream of the second stage, and wherein the second end is connected downstream of the second stage. Under operation, the direction of a flow through the bypass-line is from the first end to the second end as indicated by the broken arrows in FIG. 4. Advantageously, the bypass-line 250, 251 is formed in the first module 340 of the base portion 304. The bypass-line comprises flow adjustment means, such as a pre-configured flow constriction, a biased check valve, an adjustable valve, a regulated valve or the like. As mentioned above, the flow through the bypass-line(s) 250, 251 allows for controlling the pressure distribution in the device 200. Depending on the pressure to be influenced, the first end of the bypass-line 250, 251 may be connected at different locations between the first stage and the second stage of the dual stage gear pump: the first end of a first bypass-line 250 may be branched off from the feed-line 207 between the first stage discharge-port 206/314 and the chamber-inlet 208 for controlling the inlet-pressure; the first end of a second bypass-line 251 may be connected to a top-portion of the process-chamber 209 for releasing free air that might accumulate there, and for controlling the pressure in the process-chamber 209. Furthermore, a bypass-line 252 comprising a safety-valve (not shown) may be provided, wherein a first end of the bypass-line 252 is branched-off from the discharge-line 215 downstream of the second stage between the second stage discharge-port 214/324 and the device-output 216, and wherein a second end of the bypass-line 252 is connected to the feed-line 203 upstream of the first stage between the device-input 202 and the first stage intake-port 204/314. The safety-valve may e.g. be a pressure-relief valve or biased check-valve allowing for liquid flow from the first end of the bypass-line 252 to the second end of the bypass-line 252 when the pressure in the discharge-line 215 exceeds a pre-determined level, thereby protecting the multiple-stage pump in case the device-output 216 is shut-off or gets blocked under operation.

REFERENCE NUMBERS 99 application
100, 200 device
101, 201 input flow
102, 202 device-input
103, 203 feed-line
104, 204 intake-port
105 pump
106, 206 discharge-port
107, 207 feed-line
108, 208, chamber-inlet
109, 209 process chamber
110, 210 chamber-outlet
111, 211 discharge-line
113 back-pressure means
115, 215 discharge-line
116, 216 device-output
117, 217 output-flow
205 first stage
212 intake-port
213 second stage
214 discharge-port
221 mechanical coupling (transfer of mechanical energy)
222 multiple-stage gear pump
230, 232 plenum
231 processing element
240 stay-bolt
250, 251, 252 bypass
300 planar dual-stage internal gear pump
301, 302, 303 gear wheels
304 housing
305 flange means
306 sealing means
311, 321 outer toothing
312, 322 inner toothing
313, 323 intake-port
314, 324 discharge-port
315, 325 crescent
340, 341, 342 housing module
p1 input-pressure
p2 feed-pressure
p3 discharge-pressure
p4 output-pressure
dp process-induced change in pressure
pe excess pressure

The invention claimed is:

1. An apparatus for processing of a liquid, comprising
a housing defining a device-input for receiving the liquid to be processed at an input-pressure and a device-output for conveying the processed liquid at an output-pressure;
a process chamber defining a chamber-inlet and a chamber-outlet; wherein the chamber inlet is in communication with the device-input via a feed-line, and wherein the chamber-outlet is in communication with the device-output via a discharge line;
a pump means in communication with the feed-line for increasing the pressure of the liquid from the input-pressure to a feed-pressure at the chamber-inlet downstream of the pump means;
a back-pressure means in communication with the discharge line that can maintain a discharge-pressure at the chamber-outlet upstream of the back-pressure means at an excess-pressure above the output-pressure and reduce the pressure of the liquid from the discharge-pressure to the output-pressure downstream of the back-pressure means,
wherein the pump means in communication with the feed-line comprises a first stage of a multiple-stage gear pump, wherein the back-pressure means in the discharge-line comprises a second stage of the multiple-stage gear pump, and wherein the second stage is in communication with the first stage via a mechanical coupling.

2. The apparatus according to claim 1, wherein the first stage is operated at a higher displacement-rate than the second stage, and wherein the apparatus further comprises a bypass-line having a first end and a second end, wherein the first end is connected downstream of the first stage and upstream of the second stage, and wherein the second end is connected downstream of the second stage.

3. The apparatus according to claim 1, wherein the first stage has a first stage displacement rate that exceeds a second stage displacement rate of the second stage by between 2% and 12%.

4. The apparatus according to claim 3, wherein the first stage displacement rate exceeds the second stage displacement rate of the second stage by between 5% and 10%.

5. The apparatus according to claim 1, wherein the multiple-stage gear pump has a planar arrangement of meshing gear wheels defining the coupled stages.

6. The apparatus according to claim 1, wherein the mechanical coupling between the first gear-pump stage and the second gear-pump stage has a fixed gear ratio.

7. The apparatus according to claim 1, wherein the multiple-stage gear pump is a dual-stage gear pump with three meshing gear wheels.

8. The apparatus according to claim 1, wherein the first stage is defined by a first gear wheel meshing with a second gear wheel to provide displacement of the liquid from a first intake-port to a first discharge-port, and wherein the second stage is defined by the second gear wheel meshing with a third gear wheel to provide a second stage for displacement of liquid from a second intake-port to a second discharge-port.

9. The apparatus according to claim 8, wherein the first gear wheel has thereon an outer toothing that either (1) meshes with an outer toothing on the second gear wheel to define the first stage as an external gear pump, and an inner toothing on the second gear wheel meshes with an outer toothing on the third gear wheel to define the second stage as an internal gear pump, or (2) meshes with an inner toothing on the second gear wheel to define the first stage as an internal gear pump, and an outer toothing on the second gear wheel meshes with an outer toothing on the third gear wheel to define the second stage as an external gear pump.

10. The apparatus according to claim 8, wherein the first gear wheel has (1) an outer toothing that meshes with an inner toothing on the second gear wheel to define the first stage as an internal gear pump, and an outer toothing on the second gear wheel meshes with an inner toothing on the third gear wheel to define the second stage as an internal gear pump, or (2) an inner toothing that meshes with an outer toothing on the second gear wheel to define the first stage as an internal gear pump, and an inner toothing on the second gear wheel meshes with an outer toothing on the third gear wheel to define the second stage as an internal gear pump.

11. The apparatus according to claim 8, wherein one or more of the first and second stages are implemented as internal gear pumps and are of the crescent-type.

12. The apparatus according to claim 1, further comprising an oil-filter medium arranged inside the process chamber so that oil flown from the chamber-inlet to the chamber-outlet passes through the oil-filter medium thereby retaining solid contaminants in the oil-filter medium and releasing cleaned oil as a filtrate though the chamber-outlet.

13. The apparatus according to claim 1, wherein the process chamber and the multiple-stage gear pump are integrated in a common second housing.

14. The apparatus according to claim 13, wherein the multiple-stage gear pump is defined by an arrangement of meshing gear-wheels integrated on a first side of a base plate, wherein the process chamber is defined on a second, opposite side of the base plate by a chamber-cover sealing against the base plate, wherein the feed-line and the discharge line are provided as through-bores defining channels through the base plate, and wherein the channels connecting a pumping chamber on the first side of the base plate with the process chamber arranged on the second side of the base plate.

* * * * *